United States Patent
Cohan

(10) Patent No.: US 12,298,958 B2
(45) Date of Patent: May 13, 2025

(54) SYSTEM AND METHOD FOR CAPTURING DATA SENT BY A MOBILE DEVICE

(71) Applicant: MOBILEGUARD INC., Portland, OR (US)

(72) Inventor: Todd Michael Cohan, New York, NY (US)

(73) Assignee: MOBILEGUARD INC., Portland, OR (US)

( * ) Notice: Subject to any disclaimer, the term of this patent is extended or adjusted under 35 U.S.C. 154(b) by 185 days.

(21) Appl. No.: 18/064,552

(22) Filed: Dec. 12, 2022

(65) Prior Publication Data

US 2023/0214376 A1 Jul. 6, 2023

Related U.S. Application Data

(63) Continuation of application No. 16/834,668, filed on Mar. 30, 2020, now Pat. No. 11,531,667, which is a
(Continued)

(51) Int. Cl.
*H04L 29/06* (2006.01)
*G06F 16/22* (2019.01)
(Continued)

(52) U.S. Cl.
CPC ...... *G06F 16/2291* (2019.01); *H04L 63/0263* (2013.01); *H04M 1/66* (2013.01); *H04W 4/14* (2013.01); *H04W 12/08* (2013.01); *H04W 12/12* (2013.01); *H04W 24/08* (2013.01); *H04L 63/30* (2013.01)

(58) Field of Classification Search
CPC .............. G06F 16/2291; G06F 21/108; G06F 21/1085; G06F 21/62; G06F 21/6209; G06F 21/6218; H04L 63/0263; H04L 63/30; H04L 63/10; H04M 1/66; H04W 4/14; H04W 12/08; H04W 12/12; H04W 24/08
See application file for complete search history.

(56) References Cited

U.S. PATENT DOCUMENTS 6,456,706 B1   9/2002  Blood et al.
7,069,003 B2   6/2006  Lehikoinen et al.
(Continued)

FOREIGN PATENT DOCUMENTS

JP   2005258855 A   9/2005
KR   20110022446 A   3/2011
(Continued)

OTHER PUBLICATIONS

International Preliminary Report on Patentability for International Application No. PCT/US2016/045529, mailed Feb. 22, 2018, 13 Pages.
(Continued)

*Primary Examiner* — Malcolm Cribbs
(74) *Attorney, Agent, or Firm* — Morris, Manning & Martin, LLP; Adam J. Thompson, Esq.

(57) ABSTRACT

Systems and methods for providing capture, archival, and analysis of data sent by mobile devices over a carrier network, with the systems and methods not requiring the installation of any additional software on the mobile devices, the systems and methods also providing for alerts to be generated based on the content of the data.

18 Claims, 3 Drawing Sheets

Related U.S. Application Data continuation of application No. 15/698,098, filed on Sep. 7, 2017, now Pat. No. 10,606,817, which is a continuation of application No. 14/820,986, filed on Aug. 7, 2015, now Pat. No. 9,785,662, which is a continuation-in-part of application No. 14/322,997, filed on Jul. 3, 2014, now Pat. No. 9,124,553, which is a continuation of application No. 13/287,523, filed on Nov. 2, 2011, now Pat. No. 8,811,965, which is a continuation-in-part of application No. 12/287,868, filed on Oct. 14, 2008, now Pat. No. 8,107,944.

(51) Int. Cl.
| | | |
|---|---|---|
| *H04L 9/40* | (2022.01) | |
| *H04M 1/66* | (2006.01) | |
| *H04W 4/14* | (2009.01) | |
| *H04W 12/08* | (2021.01) | |
| *H04W 12/12* | (2021.01) | |
| *H04W 24/08* | (2009.01) | |

(56) References Cited

U.S. PATENT DOCUMENTS

| | | |
|---|---|---|
| 7,069,316 B1 | 6/2006 | Gryaznov |
| 7,113,977 B1 | 9/2006 | Baker et al. |
| 7,142,848 B2 | 11/2006 | Owen et al. |
| 7,197,321 B2 | 3/2007 | Erskine et al. |
| 7,263,353 B2 | 8/2007 | Forsberg et al. |
| 7,302,272 B2 | 11/2007 | Ackley |
| 7,516,219 B2 | 4/2009 | Moghaddam et al. |
| 7,519,990 B1 | 4/2009 | Xie |
| 7,546,334 B2 | 6/2009 | Redlich et al. |
| 7,603,294 B2 | 10/2009 | Singh et al. |
| 7,647,047 B2 | 1/2010 | Moghaddam et al. |
| 7,689,510 B2 | 3/2010 | Lamkin et al. |
| 7,787,863 B2 | 8/2010 | Van De Groenendaal |
| 7,813,822 B1 | 10/2010 | Hoffberg |
| 8,078,739 B1 | 12/2011 | Somasundaram et al. |
| 9,015,253 B1 | 4/2015 | Jarrett |
| 2002/0012445 A1 | 1/2002 | Perry |
| 2002/0078384 A1 | 6/2002 | Hippelainen |
| 2003/0220093 A1 | 11/2003 | Fellenstein et al. |
| 2004/0116842 A1 | 6/2004 | Mardirossian |
| 2004/0117478 A1 | 6/2004 | Triulzi et al. |
| 2004/0210773 A1 | 10/2004 | Markosi, III |
| 2005/0069096 A1 | 3/2005 | Claudatos et al. |
| 2005/0075097 A1 | 4/2005 | Lehikoinen et al. |
| 2005/0113130 A1 | 5/2005 | Weinzierl |
| 2005/0130633 A1 | 6/2005 | Hill et al. |
| 2005/0175156 A1 | 8/2005 | Afshar et al. |
| 2006/0079215 A1 | 4/2006 | Perrella et al. |
| 2006/0209809 A1 | 9/2006 | Ellingham et al. |
| 2006/0217136 A1 | 9/2006 | Bantukul et al. |
| 2007/0061211 A1 | 3/2007 | Ramer et al. |
| 2007/0111704 A1 | 5/2007 | Linkert et al. |
| 2007/0150948 A1 | 6/2007 | De Spiegeleer |
| 2007/0281664 A1 | 12/2007 | Kaneko et al. |
| 2007/0297418 A1 | 12/2007 | Lee |
| 2007/0299631 A1 | 12/2007 | Macbeth et al. |
| 2008/0045201 A1* | 2/2008 | Kies .................. H04W 8/22 |
| | | 455/420 |
| 2008/0114862 A1 | 5/2008 | Moghaddam et al. |
| 2008/0148358 A1 | 6/2008 | Denny et al. |
| 2008/0233919 A1 | 9/2008 | Kenney |
| 2009/0012806 A1* | 1/2009 | Ricordi .............. G06F 21/6218 |
| | | 707/999.005 |
| 2009/0092108 A1 | 4/2009 | Hargrave et al. |
| 2009/0157708 A1 | 6/2009 | Bandini et al. |
| 2009/0164522 A1 | 6/2009 | Fahey |
| 2009/0217343 A1* | 8/2009 | Bellwood ............... G06F 21/10 |
| | | 726/1 |
| 2009/0264104 A1 | 10/2009 | Lee et al. |
| 2010/0272262 A1 | 10/2010 | Boubion et al. |
| 2010/0321183 A1 | 12/2010 | Donovan et al. |
| 2011/0176451 A1 | 7/2011 | Uchida |
| 2012/0224826 A1 | 9/2012 | Caudle et al. |
| 2012/0284345 A1 | 11/2012 | Costenaro et al. |
| 2013/0091564 A1 | 4/2013 | Fitzgerald et al. |
| 2013/0152171 A1 | 6/2013 | Kindler et al. |
| 2013/0300764 A1 | 11/2013 | Gardenfors et al. |
| 2014/0146911 A1 | 5/2014 | Eliaz |
| 2015/0256666 A1 | 9/2015 | Peterson |

FOREIGN PATENT DOCUMENTS

| | | |
|---|---|---|
| KR | 1020130116458 A | 10/2013 |
| KR | 101402518 B1 | 4/2014 |
| WO | 02076046 A2 | 9/2002 |
| WO | 2006107161 A1 | 10/2006 |

OTHER PUBLICATIONS

International Search Report and Written Opinion for International Application No. PCT/US2016/045529, mailed Nov. 9, 2016, 14 Pages.

Yin J., et al., "Engineering Server-Driven Consistency for Large Scale Dynamic Web Services," Tenth International World Wide Web Conference, WWW10, Hong Kong, May 1-5, 2001, pp. 1 and 2, Retrieved from URL: http://portal.acm.org/citation.cfmid=371920.371935.

* cited by examiner

SYSTEM AND METHOD FOR CAPTURING DATA SENT BY A MOBILE DEVICE

CROSS REFERENCE TO RELATED APPLICATIONS

This application is a continuation of U.S. application Ser. No. 16/834,668, filed Mar. 30, 2020 and entitled "SYSTEM AND METHOD FOR CAPTURING DATA SENT BY A MOBILE DEVICE," which is a continuation of U.S. application Ser. No. 15/698,098, filed Sep. 7, 2017 and entitled "SYSTEM AND METHOD FOR CAPTURING DATA SENT BY A MOBILE DEVICE," which is a continuation of U.S. application Ser. No. 14/820,986, filed Aug. 7, 2015 and entitled "SYSTEM AND METHOD FOR CAPTURING DATA SENT BY A MOBILE DEVICE." which is a continuation-in-part of U.S. application Ser. No. 14/322,997, filed Jul. 3, 2014 and entitled "SYSTEM AND METHOD FOR AUTOMATIC DATA SECURITY BACK-UP AND CONTROL FOR MOBILE DEVICES," which is a continuation of U.S. application Ser. No. 13/287,523, filed Nov. 2, 2011 and entitled "SYSTEM AND METHOD FOR AUTOMATIC DATA SECURITY BACK-UP AND CONTROL FOR MOBILE DEVICES," which is a continuation-in-part of U.S. application Ser. No. 12/287,868, filed Oct. 14, 2008 and entitled "SYSTEM AND METHOD FOR AUTOMATIC DATA SECURITY, BACK-UP AND CONTROL FOR MOBILE DEVICES," each of which is incorporated herein by reference in its entirety.

BACKGROUND OF THE INVENTION

1. Field of the Invention

The present invention relates generally to capturing data sent by mobile communication devices. Further, the present invention relates to indexing and analyzing the data, as well as providing alerts based on triggers present in the data.

2. Description of the Prior Art

Generally, it is known in the relevant art to provide systems and methods for communication record logging, mobile web log related to device activity, and data back-up. Also, generally it is known in the relevant art to provide for security related to mobile devices, including portable computers and mobile communication devices and personal digital assistant (PDA) devices, By way of example, the following U.S. Patents and Publications are provided:

U.S. Pat. No. 7,069,003 for "Method and apparatus for automatically updating a mobile web log (blog) to reflect mobile terminal activity," filed Oct. 6, 2003 by Lehikoinen, et al., describes a mobile terminal including a memory storing application software and data that is descriptive of the use of the mobile terminal, a display and controller that is responsive to the application software and to at least a sub-set of the stored data for visualizing on the display, in graphical form, the use of the mobile station over time.

U.S. Publication 2007/0111704 for "System and method for communication record logging," filed Oct. 16, 2006 by Linkert, et al., discloses a method for maintaining a log of communications initiated or received at a portable electronic device, including short message service (SMS) messages, personal identification number (PIN) messages, and cellular telephone calls, wherein the method includes receiving a data record from each of the communications, extracting information from the data record, and storing information in a log file.

U.S. Publication 2007/0281664 for "Portable wireless terminal and its security system," filed May 16, 2007 by Kaneko, et al., teaches a portable wireless terminal, like a cellular phone, and its security system for preventing by remote control improper use of the portable wireless terminal by a third party when it is lost or stolen, including data back-up to a remote center by remote control from the center via a wireless network, and including encryption, public-private key, and data fragmentation.

U.S. Publication 2007/0299631 for "Logging user actions within activity context," filed Jun. 27, 2006 by Macbeth, et al., includes maintaining a log of user keystrokes, files accessed, files opened, files created, websites visited, communication events, for example phone calls, instant messaging, communications, etc.

U.S. Publication 2008/0233919 for "System and method for limiting mobile device functionality," filed Feb. 9, 2005 by Kenney, discloses mechanisms for selectively disabling mobile device functionality to prevent unauthorized access to personal data stored on the mobile device, like bank account numbers, social security numbers, and credit card numbers.

Thus there remains a need for systems and methods that provide for automatically capturing, indexing, analyzing data sent by mobile devices and generating alerts based on the data, and in particular systems and methods which do not require any additional software on the mobile devices or at the carrier network to accomplish the capturing, indexing, and analyzing of data.

SUMMARY OF THE INVENTION

A first aspect of the present invention includes a method for capturing data originating from at least one device including the steps of at least one device sending data over a network, retrieving from at least one network element the data sent over the network by the at least one device, and archiving the data sent over the network by the at least one device in at least one database.

A second aspect of the present invention is a system for capturing data originating from at least one device including at least one device operable to send data over a network, at least one network element operable to receive data from the at least one device, an application programming interface (API) operable to retrieve data from the at least one network element, and a database operable to store and/or archive the retrieved data.

None of the prior art references provide for authorized user-based rules selection, modification and remote management and implementation for mobile communications devices to include rules governing all aspects of data security and device security, such as data back-up (particularly data back-up for text messaging, image messaging, voicemails, and voice calls), device operation and access to predetermined numbers, contacts, and/or websites or addresses, device receipt of calls, messages, SMS messages, MMS messages, (photos), Instant Messages, social media applications such as Facebook, LinkedIn, Twitter and the like and websites from predetermined or all numbers, contacts, and/or websites or addresses for predetermined duration or dates/times, in addition to device locking and application control and management.

These and other aspects of the present invention will become apparent to those skilled in the art after a reading of

DETAILED DESCRIPTION

Figure 1:
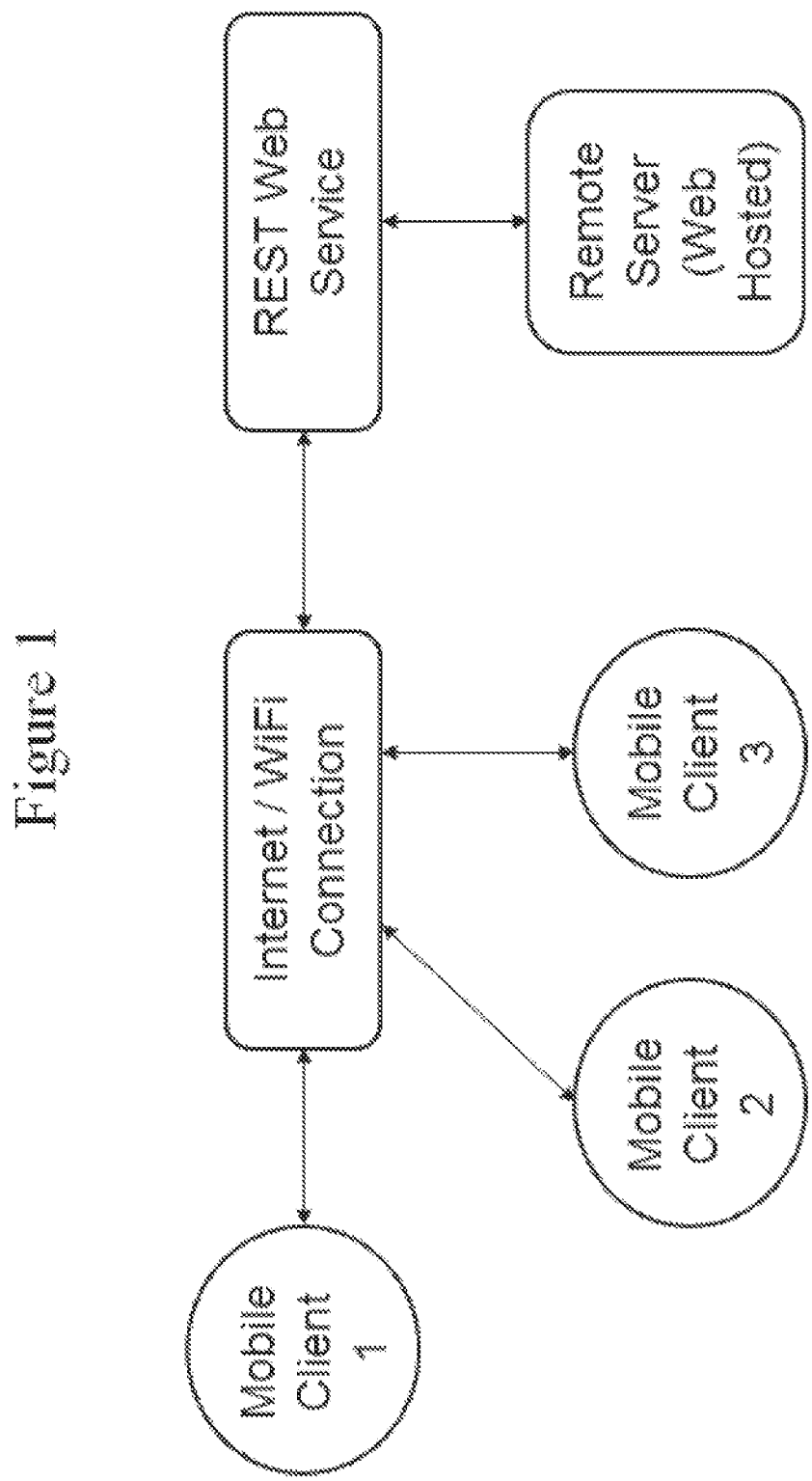
FIG. 1 illustrates a schematic diagram illustrating one embodiment of the system according to the present invention.

Referring now to the drawings in general, the illustrations are for the purpose of describing a preferred embodiment of the invention and are not intended to limit the invention thereto.

The present invention provides for systems and methods of capturing and archiving data sent by a device through a carrier to provide for monitoring and analyzing the data sent by the device without requiring any additional software applications on the device to capture, archive, or analyze the data. Not requiring any additional software applications on the device to implement the systems and methods of the present invention is advantageous over the prior art, as there is minimized risk of the operator of the device removing or tampering with the software. Additionally, no storage space or processing power of the device is used up by the systems and methods of the present invention. Furthermore, the systems and methods of the present invention can be utilized without the operator or owner of the device being aware that the systems and methods of the present invention are being utilized, leading to more accurate and/or honest data collection, archival, and analysis. In a preferred embodiment, there is also no dependency or reliance on the operating system of the device.

In another embodiment, the present invention provides systems and methods for capturing and archiving data sent by a device via WiFi. In yet another embodiment, the present invention provides systems and methods for capturing and archiving data sent by a device over a public network. In another embodiment, the present invention provides systems and methods for capturing and archiving data sent by a device over a private network.

In one embodiment, the data is retrieved, archived, and/or analyzed in its native form, with the native form being how it is displayed, encoded, or stored on the device.

In another embodiment, the data is retrieved from at least one network element.

In an exemplary embodiment, a system for capturing data originating from at least one device includes at least one device operable to send data over a network; at least one network element operable to receive data from the at least one device; an application programming interface (API) operable to retrieve data from the at least one network element; and a database operable to store and/or archive the retrieved data.

Capturing, archiving, and/or analyzing the data is preferably performed on the cloud or on a server not located at the carrier's premises. In one embodiment, the cloud is a private cloud. In another embodiment, the cloud is a public cloud. Capturing, archiving, and/or analyzing the data is performed via an application program interface (API) in another embodiment. Preferably, the API is operable to capture or retrieve the data from the carrier network in order to archive it in a database. Preferably, the database is not located at the carrier's premises. In another embodiment, the database is located at the carrier's premises. In another embodiment, the data is captured, archived, and/or analyzed at the carrier's premises, preferably on a server at the carrier's premises. Analytics is performed at a different location than capture and archiving in one embodiment. In one embodiment, analytics is provided on a computing device located remotely from the carrier and the server not located at the carrier's premises. In another embodiment analytics is performed by an analytics engine.

Preferably, the analytics engine is operable to analyze the retrieved data by determining at least one of a presence of key words in the data, a presence of key phrases in the data, a sender of the data, a recipient of the data, a time the data is sent, or a time the data is received. The analytics engine is also operable to add a pattern of data to the retrieved data. In one embodiment, the pattern of data is a social security number (9 number separated by hyphens: XXX-XX-XXXX). The pattern is credit card information in another embodiment. Preferably, at least some of the credit card information is replaced with Xs. In another embodiment, the analytics engine is operable to send an alert based on at least one of the presence of key words in the data, the presence of key phrases in the data, the sender of the data, the recipient of the data, the time the data is sent, or the time the data is received. In yet another embodiment, the analytics engine is operable to determine the most common words, the most common phrases, and/or the most common graphical elements present in the data for a predetermined time period.

In an exemplary embodiment, remote devices, including by way of example an iPhone/IOS device, Android device, Windows device, and/or Blackberry device send data to a short message service center (SMSC) or a multimedia message service center (MMSC). The SMSC or MMSC sends the data to a messaging server, which transfers data through a secure web connection (in one embodiment Port 443). In another embodiment, the SMSC or MMSC is configured to send a copy of the data to another phone number. The phone number preferably corresponds to a server. Another embodiment provides for integrating software which runs SMSC or MMSC with a server. In another embodiment, the web connection is an unsecure web connection. The data then passes through the public Internet, through a secure web, and then through a load balancer and firewall. The web is unsecure in another embodiment. From the load balancer and firewall, the data passes through at least one hot server to a database server. The data is encrypted at the database server. In one embodiment, the data is encrypted using AES 256 Bit Key. Preferably, the data is then archived in an archive system. Although devices such as the iPhone/IOS device, Android device, Windows device, and Blackberry device are utilized in the exemplary embodiment, the devices can be any device capable of sending data over a network. Other examples includes laptops, PDAs, cell phones, mobile devices, wearables, GPS devices, music players, TVs, desktop computers, fax machines, landline phones, automobiles, etc.

The data includes SMS messages, MMS messages (photos, videos, group messages), voice data, words used in a voice conversation, words used in an email, words used in a voicemail, voicemail, data relating to phone calls, instant messages, data transmitted over social media applications such as Facebook, LinkedIn, Twitter, Instagram, Vine and the like, emails, location and GPS data, financial transaction data including mobile payment system data, web browsing data, email data, and combinations thereof.

In one embodiment, the data is captured and/or archived in real-time. In another embodiment, the data is captured and/or archived in near real-time. In another embodiment, the data is captured in real-time or near real-time and archived once per day. Preferably, the data is archived in a private cloud or on the premises of a business. Preferably, the data is analyzed after the data is captured and archived. In one embodiment, the data is analyzed in real-time. In another embodiment, the data is analyzed in near real-time. In yet another embodiment, the data is analyzed at regular intervals, such as 1 minute intervals, 5 minute intervals, 15 minute intervals, 30 minute intervals, hour intervals, four hour intervals, eight hour intervals, twelve hour intervals, daily intervals, weekly intervals, monthly intervals, quarterly intervals, and yearly intervals. Another embodiment provides for data over any period of time to be analyzed at any time.

The data can be collected, stored, and transmitted in a variety of different methods. Once method includes utilizing an API. In another embodiment, batch file transfer is utilized. Another embodiment provides for the carrier transmitting a file via FTP. Another embodiment provides for phone number journaling. In yet another embodiment, Secure File Transfer Protocol (SFTP/SSH) are utilized, Another embodiment utilizes file transfer protocol (FTP). A virtual private network (VPN) is utilized in another embodiment.

Advantageously, the present invention is carrier agnostic in one embodiment. The present invention is also preferably device agnostic in one embodiment. Advantageously, any device capable of sending or receiving information over a network is capable of being used in the systems and methods of the present invention.

Analyzing the data (also referred to as analytics) includes analyzing the data for keywords and/or phrases in one embodiment. In another embodiment, analytics includes determining the data sent and/or received by a particular user or group of users. In another embodiment, analytics includes determining data sent during a particular time frame, such as during working hours, after working hours, or within time frame(s) across a period of days. Analytics includes analyzing one type of data, such as SMS messages, MMS messages, voice data, web browsing data, social media data, email data, location/GPS data, mobile payment system data, and combinations thereof in one embodiment. Another embodiment includes analyzing one or more types of data for the most common words, phrases, visual elements, audio elements, etc. for a particular time period, such as the past week, day, hour, or minute. In another embodiment, the most common words, phrases, visual elements, audio elements, etc. are identified in real-time or near real-time. Preferably, the most common words, phrases, visual elements, audio elements, etc. are conveyed through a list. In one embodiment, the list is ranked by the number of occurrences.

One embodiment of the present invention provides for replaying or displaying the data. Preferably, context is provided for the data. In one embodiment where the data includes SMS messages, prior SMS messages and/or future SMS messages in the message chain are displayed.

Another embodiment of the present invention provides for alerts to be issued based on capturing, archiving, or analyzing the data. In one embodiment the alerts are issued in real-time. In another embodiment, the alerts are issued in near real-time. In one embodiment, the alerts are issued at predetermined intervals, such as hourly, daily, weekly, monthly, or yearly. Preferably, the alerts are based on a key word or phrase. In another embodiment, the alerts are based on the type of data captured, archived, or analyzed. In yet another embodiment, the alerts are based on the source of the data. The alerts are based on the recipient of the data in another embodiment.

In one embodiment, the alerts are communicated over a network. Preferably, the network is a cellular network. Alerts communicated over a cellular network are preferably communicated via SMS, MMS, or voice. In another embodiment, the network is the Internet. Communication of alerts over the Internet is via email in one embodiment. In another embodiment, communication of alerts over the Internet is via a web page or website.

In one embodiment, a primary data center is in communication with a secondary data center over the Internet. The primary and/or secondary data centers preferably act to handle processing load equitably. The primary and/or secondary data centers preferably have at least one SSL certificate. In one embodiment, the at least one SSL certificate is issued to mobileguard.domain.com. Preferably, the primary and/or secondary data centers are connected via DMZ (preferably via Port 80 and/or Port 443) to at least one server. The at least one server preferably has at least an 8 core processor, 8 GB RAM, 160 GB Disk, and Windows Server 2008 R2. In an exemplary embodiment, the at least one server is two servers. Preferably, the at least one server is connected to at least one of a Relational Database Management System (RDMS), an Active Directory, and a Simple Mail Transfer Protocol (SMTP) Server. In one embodiment, the relational database management system is MS SQL 2008. Preferably, the MS SQL 2008 includes 160 GB, and is a web, standard, or enterprise edition. In one embodiment, the at least one server utilizes Lightweight Directory Access Protocol (LDAP) to communicate with the Active Directory, Preferably, the SMTP server delivers data for archiving. In one embodiment, the at least one server is connected to the RDMS via Port 1433. In another embodiment, the at least one server is connected to the Active Directory via Port 389 or Port 636. In another embodiment, the SMTP server is connected to the at least one server via Port 25. Preferably, the at least one server communicates with the SMTP server via a Transport Layer Security (TLS) protocol. In one embodiment, a primary or secondary server establishes a VPN with carrier to receives data and/or a VPN is established with other systems (such as archiving) to deliver data.

One embodiment of the present invention provides for activating or enrolling a device. Preferably, an authorization email or text is sent to an employee or to an IT personnel through an administrative console. Preferably, the authorization email or text includes a link to initiate the process or activating or enrolling the device. In one embodiment, selecting the link activates or enrolls the device. In another embodiment, selecting the link provides an interface which instructs the employee or IT personnel to send a key word, key number, key characters, or key phrase to a specified number, email, or to enter the key word, key number, key characters or key phrase in a web page. Preferably, sending the key word, key number, key characters, or key phrase to the specified number, email, or entering the key word, key number, key characters or key phrase in a web page provides information to a carrier or a third party authorized to activate or enroll the device. Preferably, the carrier or the third party authorized to activate or enroll the device activates or enrolls the device. In one embodiment, the carrier or the third party authorized to activate or enroll the device sends verification to the operator of the systems and methods of the present invention and/or to the device. Preferably, authorization codes are stored by the operator of the systems and methods of the present invention and/or by the device. In one embodiment, no action is needed from the devices to provision/enroll for data capturing when data is captured from the carrier.

Another embodiment of the present invention provides for activating or enrolling multiple devices at once. Preferably, a "global" authorization message is sent to a party authorized to opt in the multiple devices. The party authorizes the multiple devices to be activated or enrolled. In one embodiment, authorization is performed through a user interface or an integrated user interface using an API to the operators. This would allow activation or enrollment of numerous devices, potentially thousands, at once and preferably simultaneously. This embodiment is particularly useful for enterprise customers and/or government customers.

In another preferred embodiment, no authorization is required for activating or enrolling a device. This embodiment is particularly useful when the device user's knowledge of activation or enrollment could affect the data sent over the device. Whether authorization is required for activating or enrolling a device is dependent on local laws in one embodiment.

Yet another embodiment of the present invention provides for systems and methods of capturing and archiving data which is attempted to be sent by a device through a carrier to provide for monitoring and analyzing the data attempted to be sent by the device without requiring any additional software applications on the device to capture, archive, or analyze the data. Not requiring any additional software applications on the device to implement the systems and methods of the present invention is advantageous over the prior art, as there is minimized risk of the operator of the device removing or tampering with the software. Additionally, no storage space or processing power of the device is used up by the systems and methods of the present invention. Furthermore, the systems and methods of the present invention can be utilized without the operator or owner of the device being aware that the systems and methods of the present invention are being utilized, leading to more accurate and/or honest data collection, archival, and analysis.

Preferably, the present invention provides for blocking receipt of messages by the intended recipient and/or filtering content from the messages based on filters. The filters are pre-defined filters in one embodiment. In another embodiment, the filters are dynamically adjustable in real-time or near real-time. Preferably, the content filtered is text based content. This could be useful for filtering profanity or obscene language from messages intentionally or inadvertently sent to people who are offended by such language. In another embodiment, the content filtered is image based content. In a preferred embodiment of blocking receipt of messages by the intended recipient, the receipt of messages is blocked based on the identity of the sender and/or the identity of the intended recipient. In another embodiment, the receipt of messages is blocked based on the day or time frame in which the message is sent. Another embodiment of the present invention provides for temporarily blocking the receipt of messages. The messages which are temporarily blocked are preferably relayed to the intended recipient at a time in the future. Preferably, the time in the future is specified by the intended recipient. Advantageously, the intended recipient may delay receipt of messages from specified users or phone numbers. In another embodiment, the intended recipient may delay receipt of messages from all users of phone numbers except users or phone numbers specified by the intended recipient. This could be useful if the intended recipient is awaiting receipt of a particular message or call from a particular party, and does not wish to be distracted from that particular message or call when it arrives. Blocking or delaying receipt of data is preferably performed on the cloud or on a server not located at the carrier's premises. In one embodiment, the cloud is a private cloud. In another embodiment, the cloud is a public cloud. In another embodiment, the data is blocked or delayed at the carrier's premises, preferably on a server at the carrier's premises, Preferably, when the data is blocked, it is held in a queue until it is approved by an administrator, released to the receiving party, forwarded to another department (such as a legal department) for review, or deleted by the administrator.

One embodiment of the present invention provides for integration of emails and text with MIME format. A sample MIME output is displayed below. The X-ZANTAZ-RECIP shows both the sender and the recipient in one embodiment of the present invention. The email address is used for a user who is enrolled in the systems and methods of the present invention in one embodiment. Senders or recipients who are not enrolled in the systems and methods of the present invention have an email address constructed from a phone number associated with that sender or recipient. The message text is displayed in the last line of the MIME output in one embodiment of the present invention.

MIME-Version: 1.0
X-Priority: 3 (Normal)
Content-class: urn:content-classes:message
Content-Type: text/plain; charset="utf-8"
Content-Transfer-Encoding: quoted-printable
X-ZANTAZ-RECIP: lauren.wu@xxxxxx.com.14084090727@sms_from.com
X-ZANTAZDOCCLASS: BBTXT
X-ZANTAZ-Content-Type: bbtxt2
X-Mailer: MessageGuard
X-PINcushion-From: ece.bbtxt@xxxxxx.com
X-PINcushion-To: aefa@xxx.digitalsafe.net
X-ComplianceEngine-RowId: 32805
Date: Thu, 20 Jan. 2011 09:38:59-0500
From: 14084090727@sms_from.com
Return-Path: 14084090727@sms_from.com
To: lauren.wu@xxxxxx.com
MESSAGE-ID: 0000000000003929@mobileguard.com
Subject: Text Message Archive
- - - 2011 Jan. 20 14:38:59Z - - -
+14084090727@sms_from.com to lauren.wu@xxxxxx.com::) that would be great! I can't wait to meet him!

Another embodiment of the present invention provides for a system having at least one mobile communication device with software operable thereon for receiving rules provided by an authorized user of the device(s) and in accordance with those rules administering actions to provide for controlling and security data stored or generated on the device(s), including logging data and activities related to the mobile communications device, blocking and filtering calls, messages, SMS messages, MMS messages, (photos), Instant Messages, social media applications such as Facebook, LinkedIn, Twitter and the like, websites, emails, voice, automobiles, and combinations thereof, via wireless communication with a remote server computer having a corresponding software module operable thereon for managing and implementing the rules. Accordingly, FIG. 1 illustrates a schematic diagram illustrating one embodiment of the system according to the present invention, including a remote server computer (RSC), wireless network communication signals, a REST based web service to connect mobile device to RSC, and at least one mobile device in communication with the RSC, data stored in memory on the device(s) and having back-up data stored in memory at the RSC. One of ordinary skill will understand and appreciate that other computer components including processors, input/output devices and displays with graphical user interface operability are included in the system for providing user inputs and for reviewing status indication of the rules and status of implementation on device(s) via remote access or direct access to the server through a network via the target device or other non-target devices not governed by the rules.

Figure 2:
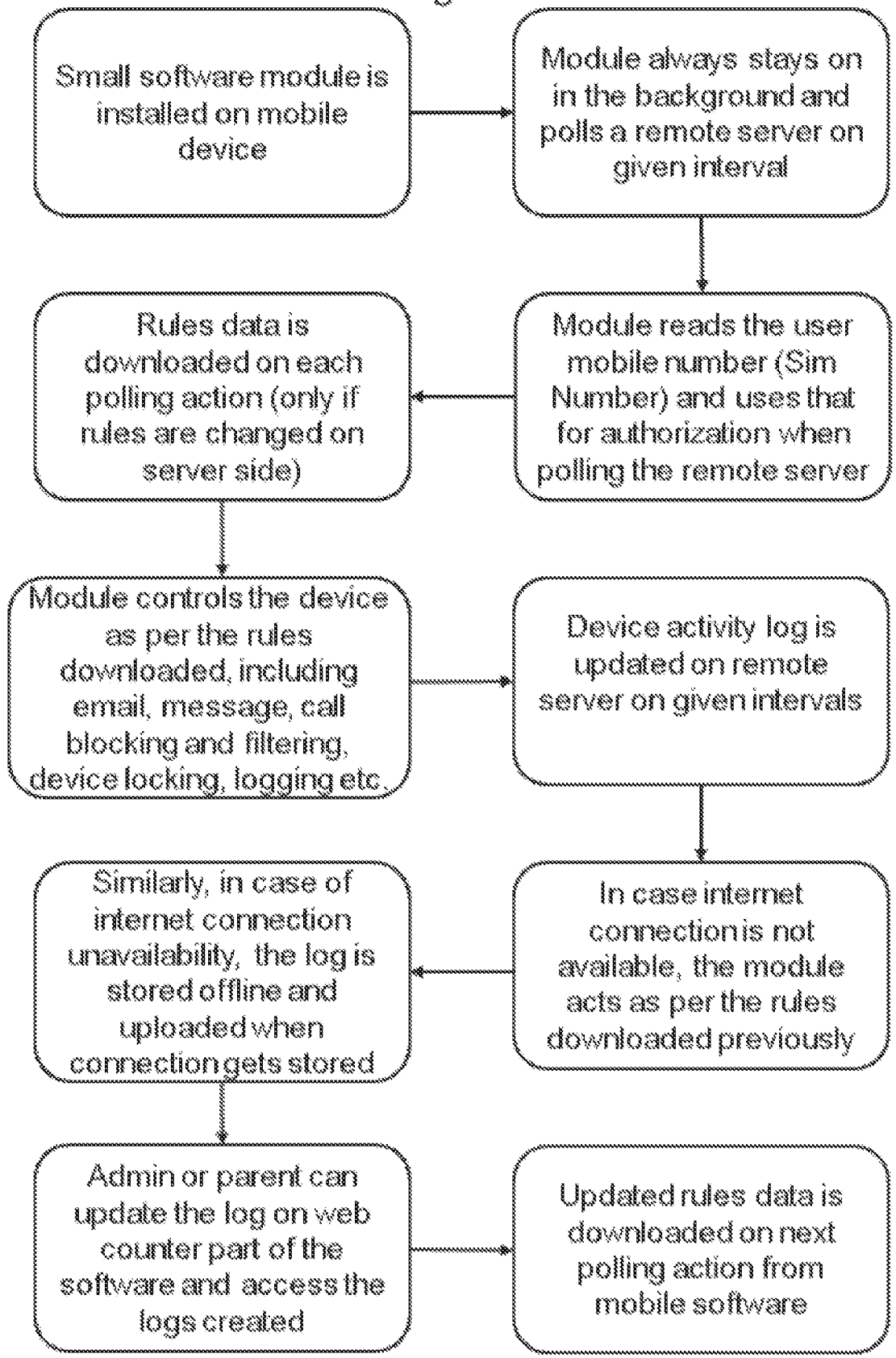
FIG. 2 shows a flow diagram illustrating steps involved with methods of the present invention.

Additionally, the present invention provides methods for providing automatic control and security for mobile communication devices and data created and/or stored thereon based upon rules selected by an authorized user of the device, including steps of providing software operable on the device for logging data and activities related to the mobile communications device, blocking and filtering communication, including data and voice conversations in real-time and voicemail left on the carrier network, calls, messages, SMS messages, MMS messages, (photos), Instant Messages, social media applications such as Facebook, LinkedIn, Twitter and the like, websites, emails, and combinations thereof, via wireless communication with a remote server computer and system as set forth hereinabove. FIG. 2 shows a flow diagram illustrating steps involved with methods of the present invention, providing the software program module operable on the mobile communication device, and steps associated with associating an authorized user(s) with the device as set forth herein below, the software program module operating with the following steps: being activated upon installation or download and operating substantially continuously for polling and/or communication with a remote server computer, downloading rules from the server including initial rules and rules updates as available, administering the rules for controlling the device operation, uploading data to the server, wherein the data includes activity log, activity data, duration, frequency, content, etc., storing select data on the device, storing select data only when the device is offline, and combinations thereof. The present invention further provides for forwarding the data in a customizable format, making it readable and searchable to a third-party vendor or to the customer's server on premises. Thus, the device software and the RSC provides for all SMS messages, Instant Messages, (chat), MMS messages, (photo), social media applications such as Facebook, LinkedIn, Twitter and the like, voice conversations and voicemail left on the carrier network to be captured, logged, archived and made searchable by the customer via the graphical user interface or sent to a third-party provider or to customers premise.

Figure 3:
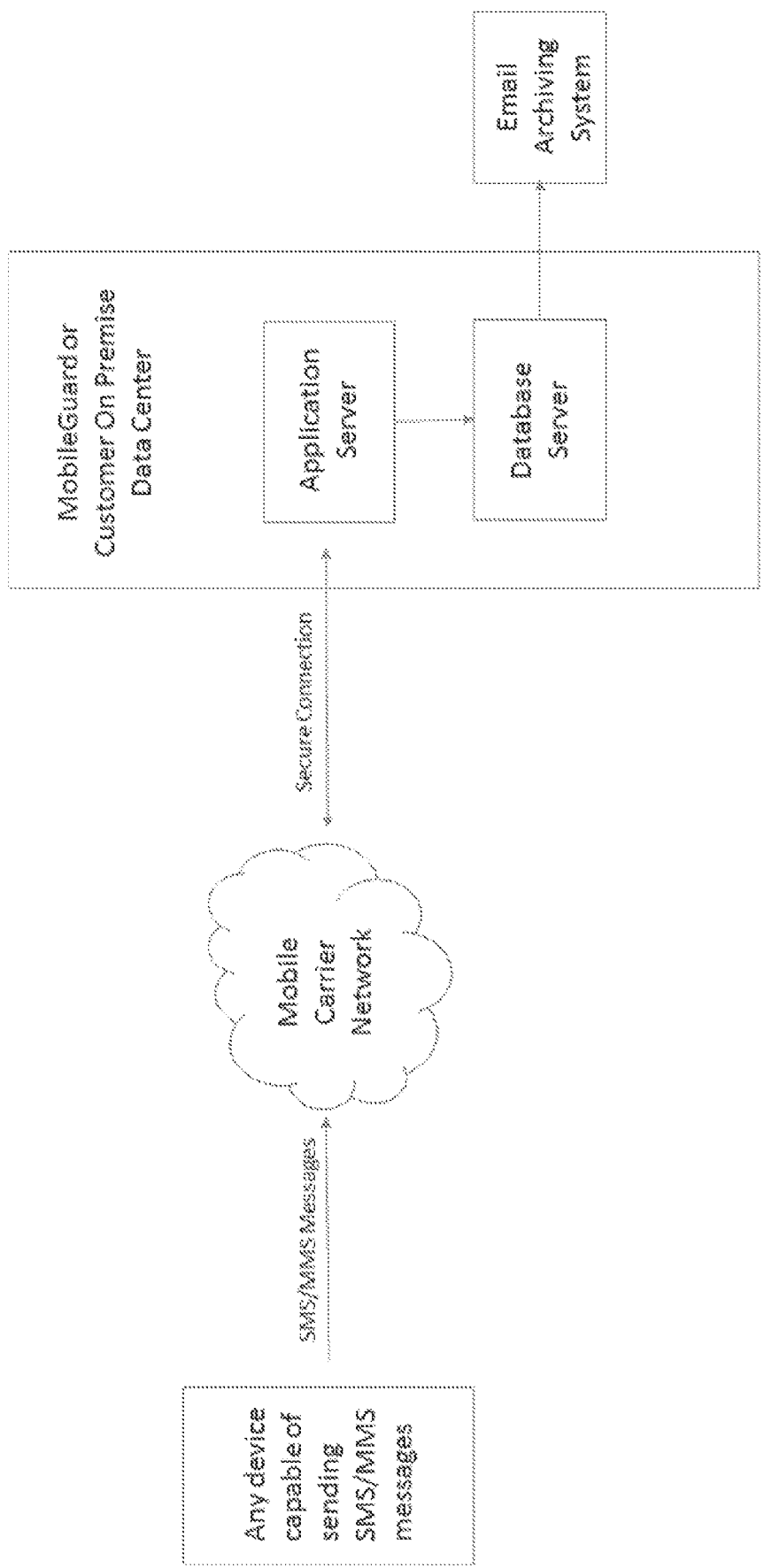
FIG. 3 shows a network architecture for the flow and storage of messages for one embodiment of the present invention.

FIG. 3 shows a network architecture for the flow and storage of messages for one embodiment of the present invention. A device capable of sending SMS/MMS messages sends the messages through the mobile carrier network. Via a secure connection, the application server of the present invention obtains the messages. The application server is preferably located at a remote datacenter or at a customer's premises. The application server sends the messages to a database server, which preferably archives the messages in an email archiving system. The secure connection between the mobile carrier network and the application server can be via the carrier's API In another embodiment, the carrier can transmit the file to the application server via FTP using the secure connection. The SMSC and/or MMSC could also be configured to send a copy of all messages to a second phone number which resides on the application server. In another embodiment, the secure connection is an integration with the SMSC/MMSC, similar to what the carriers currently do with their messaging server. In another embodiment of FIG. 3, the messages are sent through the mobile carrier network via a SMSC/MMSC, through a messaging server, through a secure web connection and firewall (preferably port 443) and to the public internet. Via the public internet, the messages are sent via secure web through a load balancer and firewall to at least one hot server (and preferably two hot servers), then to a database server where the data is encrypted using AES 256 Bit Key. From the database server, the data is archived in an archive system.

In another embodiment of FIG. 3 the messages pass through the mobile carrier network vis a SMSC/MMSC, through a messaging server, through a secure web connection and firewall (preferably port 443) and to the public internet. From the public internet, the messages pass through a primary data center and a secondary data center, both having load balancer SSL Certificates. From the data centers, the messages pass through DMZ (Port 80 and 443, with Port 443 being for Outgoing traffic), and to two sets of servers. The servers preferably have an 8 core processor, 8 GB RAM, and 160 GB Disk memory, with the servers running Windows server 2008 R2. From the sets of servers, the messages pass to sets of ports (preferably Port 1443, Port 389 or 636, and Port 25 with or without TLS). Preferably, there is a MS SQL 2008 160 GB web, standard, or enterprise edition port, a LDAP and active directory port, and a SMTP server (archiving port) in each set of ports.

Preferably, the steps include an authorized user associated with at least one mobile communication device or an administrator establishing rules governing the operation of the functions of the system for providing data and device security and remote access to same by the authorized user. The rules may be selected from predetermined options or generated uniquely by the user and input to the system by the authorized user following an authentication and/or authorization step. The device-operable software functions to provide the steps according to those rules, including but not limited to logging and storing data input and/or generated on the mobile communication device, blocking and/or filtering phone calls, messages, and/or websites, archiving data and tagging it for retrieval and optional search ability, auditing and reporting and locking the device from predetermined selected or all activity for a duration or programmed date(s) and corresponding time(s).

In preferred embodiments of the present invention, the rules for all functionality of the software and corresponding device security and data security and all associated activities are defined by the authorized user(s) of the device or the device owner or administrator. In the case of corporate or business mobile communications, the device authorized user may have a first predetermined level of rules options for selection and implementation, and a system administrator or supervisor may have a second predetermined level of rules options that provide for overriding and/or limiting selections of the actual device user. Similarly, in the case of minor children, a child device authorized user may have a first predetermined level of rules options and the parent(s) or legal guardian(s) may have a second predetermined level of rules options that provide for administrative authorization and access to the data back-up, as well as blocking and filtering and device locking functions. For example, the second predetermined level of rules may include: remote wipe/erase of the device, remote lock of the device, clearing and resetting the password, preventing certain applications from being installed and/or deleted and locking use of camera and the like.

Other examples include the device software and RSC providing mobile applications to be installed, uninstalled and managed remotely over the network directly to the mobile device. The system and device tracks and controls approved and unapproved applications being installed on the device and ensures users install approved applications. Also the system and device manage, lock, and permit users to access specific web-based applications, mobile applications and SaaS services and internet sites. The device software and RSC further provides for remote control of which devices are permitted or prohibited to connect to an internal network.

The device software and the RSC according to the present invention also provide for a "push" notification prompting the device to check in for tasks, policies and queries.

A complete inventory management of the devices which have the device software installed and are "connected" to the RSC is provided for, including user authentication, certificate enrollment and device configuration.

In any case, the rules can be selected, generated and input to the system through a mobile application on a mobile device or a web-based user interface accessible by any web-enabled device, including but not limited to the target mobile communication device(s) to which those rules would apply. Additionally, rules may be updated, modified, reviewed, and eliminated by authorized users through the same type of user interface via the web, regardless of device access. As will be understood and appreciated, user authentication and authorization may be provided in a number of ways, including, by way of example and not limitation, a user identification (userID) and corresponding password, passcode, or personal identification number (PIN). Additional authorized users can be added or removed through this system only if an authorized user accesses the system securely with the userID and corresponding passcode. Biometric authentication and other forms of user identification and authentication may be provided in substitute or supplement as appropriate. Preferably, the rules are administered via software operable from the RSC side, thereby providing a smaller software footprint operable on the device, i.e., providing a client side application as a small utility installed or downloaded on the mobile communication device upon registration with the system; in this manner, the application can always be operable or "on" to manage implementation of the rules on the device(s) without interfering with regular operation or draining power or memory in a significant manner. In another embodiment, the rules are administered via bulk provisioning through an API user interface. Preferably, the bulk provisioning is performed at the carrier level. The client side application is operable to poll the RSC on regular and predetermined intervals for checking for new rules data, uploading logs from the device to the RSC, and functioning to conform to any other rules associated directly with that device. A single authorized user can add multiple devices in the system and thus control more than one device from within the same interface. This way, in corporate environments, a single admin can control all devices of the organization and similarly the parents can control devices for all children. Unlike prior art logging functions for remote communication devices, the present invention logging extends beyond SMS messaging, MMS messaging, IM messaging, social media applications such as Facebook, LinkedIn, Twitter and the like, voice calls, voicemails, automobile monitoring, call activity logging, i.e., identifying what calls and SMS messages originate on the device or that were received or calls missed to that device and/or the location of the device. The present invention provides for logging of SMS messages, MMS messages, and telephone calls and recordings left on the carrier network, including inbound or outgoing, and preferably includes additional data associated therewith (the call timers, name data from contacts and so on), including rules implementation such as call time limitation to predetermined numbers or recipients. Also, logging includes information relating to browsing history, including website information and URL, duration and frequency of website visit, downloading history, and other similar activities. Also, text messaging email messaging, MMS messaging, (photos) and $3^{rd}$ party chat application data and social media applications such as Facebook, LinkedIn, Twitter and the like are included in the logging functions of the present invention. Importantly, with the automated rules implementation including back-up of data and logging information, the present invention provides for the elimination of stored data on the mobile communications device since the device can actively connect with the RSC for retrieving data rather than storing data on the device directly. The data is stored on device on temporary basis if the internet connection is not available and is uploaded to RSC when connection is restored. When uploading the system maintains a parity check for upload activity and unless the data is uploaded successfully, the transactions are not considered as complete, Rules governing data retained on the device in the case of limited wireless connectivity but need for access to certain predetermined information are preferably provided.

Additionally, the RSC controls device security by providing for blocking and filtering of calls, SMS messages, MMS messages, Instant Messages, Social Media messages, $3^{rd}$ party chat applications, banking transactions and URLs based upon the rules. Either predetermined or all numbers or initiators can be blocked from sending communication, data, messages, or calls to the device(s). Also, keywords, key phrases and number sequences can be used as the basis for blocking and/or filtering as well. Selective or all URL blocking or filtering of websites based upon URL, owner, content, etc. is also provided, based upon the rules.

In preferred embodiments, the RSC and software associated with the server side module of the present invention provide for scalability without limitation to number of devices and geographic locations, networks, etc. Initial embodiments provide for software supporting Windows Mobile, Google Android, Symbian and RIM Blackberry and Apple IOS devices that are commercially available globally; however, platforms, devices, and operating systems of mobile communications devices can be addressed through software modifications for compatibility and improvements, as well as new devices. The RSC software is designed in consideration to add more platforms and no changes are required on server side software when adding new mobile platforms.

The present invention also further provides for mobile communication device having automated security and control of device functionality including; a mobile device with a software program module operable thereon, wherein the module administers rules that govern device functionality, including filtering and blocking communication to and/or from the device, logging device activity, storing data associated with device activity, including activity frequency, duration and content, and combinations thereof, as well as other functionality set forth hereinabove relating to those aspects of the system applicable at the device level.

Additionally, the system can filter and block such information as passwords or identification numbers such as social security numbers from leaving the device and alert the administrator to these. The system may also similarly filter, block and alert for PING probes. A policy of flagging words, phrases or number sequences can be used to enhance the security of the device.

Certain modifications and improvements will occur to those skilled in the art upon a reading of the foregoing description. By way of example, the blocking and filtering steps may extend beyond phone calls, SMS messages, IM messages MMS messages, Social Media messages, emails, and websites to further include blocks and filtering of advertising, location information, transactions including commercial transactions, money transactions and solicitations of any form to the mobile communication device, based upon the rules selected and/or predetermined by the authorized user of the device. Similar options for backup and restore of contacts, calendar and other vital data are also available. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for capturing and controlling data originating from at least one device, the method comprising:
    receiving, from at least one device and via an application programming interface (API), an indication of rules for controlling data;
    retrieving, via the API, the data from at least one network element corresponding to a network, wherein the data was sent over the network by the at least one device and the data was received at the at least one network element; and
    outputting instructions for a computing device associated with the API to perform one or more actions based at least in part on the rules for controlling the data, each of the one or more actions being associated with data security, device security, and/or remote access to the data, wherein the one or more actions comprises (i) auditing the data and (ii) in response to the data indicating performance of one or more unauthorized actions by the at least one device, locking the at least one device from one or more predetermined activities for a predetermined duration.

2. The method of claim 1, wherein the one or more actions comprises logging and/or storing the data.

3. The method of claim 1, wherein the one or more actions comprises blocking or filtering a communication attempt or access to a website or other information source.

4. The method of claim 1, wherein the one or more actions comprises archiving the data and tagging the data for subsequent searchability and retrieval.

5. The method of claim 1, wherein:
    the at least one device comprises a plurality of devices; and
    receiving the indication of rules for controlling the data comprises a single instance of receiving the indication of rules, wherein the rules are associated with controlling the data from each of the plurality of devices.

6. The method of claim 1, wherein receiving the indication of rules comprises receiving, via the API, a user selection from a plurality of predetermined rules options.

7. The method of claim 1, wherein receiving the indication of rules comprises receiving, via the API, a user-generated set of rules.

8. The method of claim 1, further comprising:
    receiving, from the at least one device and via the API, authentication credentials;
    authenticating the at least one device based at least in part on the authentication credentials; and
    permitting the at least one device to access at least some of the data.

9. A method for capturing and controlling data originating from at least one device, the method comprising:
    receiving, from at least one device and via an application programming interface (API), an indication of rules for controlling data;
    retrieving, via the API, the data from at least one network element corresponding to a network, wherein the data was sent over the network by the at least one device and the data was received at the at least one network element;
    outputting instructions for a computing device associated with the API to perform one or more actions based at least in part on the rules for controlling the data, each of the one or more actions being associated with data security, device security, and/or remote access to the data;
    receiving, from the at least one device and via the API, authentication credentials, wherein the authentication credentials are first authentication credentials that are associated with a first device of the at least one device and a first level of rules;
    authenticating the at least one device based at least in part on the authentication credentials;
    permitting the at least one device to access at least some of the data;
    receiving, from a second device of the at least one device and via the API, second authentication credentials;
    authenticating the second device based at least in part on the second authentication credentials; and
    receiving, from the second device, instructions for modifying the indication of rules received from the first device.

10. A system for capturing and controlling data originating from at least one device, the system comprising:
    at least one processor operative to:
        receive, from at least one device and via an application programming interface (API), an indication of rules for controlling data;
        retrieve, via the API, the data from at least one network element corresponding to a network, wherein the data was sent over the network by the at least one device and the data was received at the at least one network element; and
        perform one or more actions based at least in part on the rules for controlling the data, each of the one or more actions being associated with data security, device security, and/or remote access to the data, wherein the one or more actions comprises (i) auditing the data and (ii) in response to the data indicating performance of one or more unauthorized actions by the at least one device, locking the at least one device from one or more predetermined activities for a predetermined duration.

11. The system of claim 10, wherein the one or more actions comprises logging and/or storing the data.

12. The system of claim 10, wherein the one or more actions comprises blocking or filtering a communication attempt or access to a website or other information source.

13. The system of claim 10, wherein the one or more actions comprises archiving the data and tagging the data for subsequent searchability and retrieval.

14. The system of claim 10, wherein:
the at least one device comprises a plurality of devices; and
receiving the indication of rules for controlling the data comprises a single instance of receiving the indication of rules, wherein the rules are associated with controlling the data from each of the plurality of devices.

15. The system of claim 10, wherein receiving the indication of rules comprises receiving, via the API, a user selection from a plurality of predetermined rules options.

16. The system of claim 10, wherein receiving the indication of rules comprises receiving, via the API, a user-generated set of rules.

17. The system of claim 10, wherein the at least one processor is further operative to:
receive, from the at least one device and via the API, authentication credentials;
authenticate the at least one device based at least in part on the authentication credentials; and
permit the at least one device to access at least some of the data.

18. A system for capturing and controlling data originating from at least one device, the system comprising:
at least one processor operative to:
receive, from at least one device and via an application programming interface (API), an indication of rules for controlling data;
retrieve, via the API, the data from at least one network element corresponding to a network, wherein the data was sent over the network by the at least one device and the data was received at the at least one network element;
perform one or more actions based at least in part on the rules for controlling the data, each of the one or more actions being associated with data security, device security, and/or remote access to the data;
receive, from the at least one device and via the API, authentication credentials, wherein the authentication credentials are first authentication credentials that are associated with a first device of the at least one device and a first level of rules;
authenticate the at least one device based at least in part on the authentication credentials;
permit the at least one device to access at least some of the data;
receive, from a second device of the at least one device and via the API, second authentication credentials;
authenticate the second device based at least in part on the second authentication credentials; and
receive, from the second device, instructions for modifying the indication of rules received from the first device.

\* \* \* \* \*